US008876001B2

(12) United States Patent
Herwig et al.

(10) Patent No.: US 8,876,001 B2
(45) Date of Patent: Nov. 4, 2014

(54) METHODS AND APPARATUS FOR IMAGE RECOGNITION IN CHECKOUT VERIFICATION

(75) Inventors: Nathaniel C. Herwig, Lawrenceville, GA (US); Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 1708 days.

(21) Appl. No.: 11/834,773

(22) Filed: Aug. 7, 2007

(65) Prior Publication Data

US 2009/0039164 A1 Feb. 12, 2009

(51) Int. Cl.

| | |
|---|---|
| ***G06F 17/00*** | (2006.01) |
| ***G06K 15/00*** | (2006.01) |
| ***G06F 19/00*** | (2011.01) |
| ***G07G 1/00*** | (2006.01) |
| ***G07G 1/14*** | (2006.01) |

(52) U.S. Cl.

CPC . *G07G 1/009* (2013.01); *G07G 1/14* (2013.01)

USPC ....... 235/383; 235/375; 235/385; 235/462.01

(58) Field of Classification Search

USPC .................................................. 235/383, 385

See application file for complete search history.

(56) References Cited

U.S. PATENT DOCUMENTS

| | | | | |
|---|---|---|---|---|
| 2005/0173527 | A1* | 8/2005 | Conzola | 235/385 |
| 2005/0189411 | A1* | 9/2005 | Ostrowski et al. | 235/383 |
| 2006/0265290 | A1* | 11/2006 | Perrier et al. | 705/26 |
| 2007/0084812 | A1* | 4/2007 | Hardy et al. | 211/189 |
| 2008/0061139 | A1* | 3/2008 | Roquemore | 235/383 |

* cited by examiner

*Primary Examiner* — Tuyen K Vo

(74) *Attorney, Agent, or Firm* — Peter H. Priest

(57) ABSTRACT

Systems and techniques for automated checkout verification. Product identification information is received and used as an index to retrieve a set of images associated with the identified product. The images may provide multiple views of the product. As the product is presented for purchase, an image of the product is captured and compared with the set of retrieved images. If it is determined that the captured image does not match the set of retrieved images, a security alert is issued.

8 Claims, 2 Drawing Sheets

METHODS AND APPARATUS FOR IMAGE RECOGNITION IN CHECKOUT VERIFICATION

FIELD OF THE INVENTION

The present invention relates generally to improvements to retail checkout verification. More particularly, the invention relates to improved systems and techniques for the use of image recognition in checkout verification.

BACKGROUND OF THE INVENTION

Automation has greatly increased the efficiency of retail checkout operations over the years. Employee operated checkout operations have gained greatly in efficiency, and self checkout operations have also become possible, providing for significant labor savings for merchants and increased convenience for customers choosing to use self checkout. One problem associated with checkout operations is the need to prevent theft. This concern is also applicable in employee operated systems, but is of particular importance in the context of customer operated self checkout. If a transaction is not closely monitored, numerous opportunities exist for an unscrupulous customer to take merchandise without entering it into a transaction, but using an employee to guard against such theft adds labor costs that might be avoided if monitoring of purchases can be further automated and improved.

Several prior art systems use weight scales to match items against transaction entries, for example by actual versus expected weight comparisons. Systems may also use imaging or other optical techniques to compare an approximate volume of an item against an expected volume. Image capture has been used to store images for review or to provide images to a monitoring station, but specific automated matching of item images against transaction entries has not heretofore been successfully performed in the manner to be described herein. One obstacle to automated image matching is that a comprehensive comparison of an item against the large number of items, such as the 40,000 to 100,000 items that might be carried by a large retailer, could require more time than would be acceptable for a customer or for a merchant.

SUMMARY OF THE INVENTION

The present invention addresses such problems, as well as others, by reducing the scope of the comparison process required for image recognition. In accordance with one aspect of the present invention, image recognition occurs after an item has been scanned or otherwise entered into a transaction, and placed in the bagging area or other area where image recognition is to take place. An image is taken of the item, and the captured image is compared against a set of images corresponding to the item that was entered into the transaction. Additional or different views may be taken if needed, for example, by adjusting the camera position or by zooming in on the item. If the captured image does not correspond to the set of images associated with the item as entered into the transaction, or if no item is detected in the bagging area, an alert may be sent to an employee, who may then check to determine the cause of the problem, such as an error in recognition, an error in transaction entry by the customer, a deliberate substitution, or some other cause. In addition to placing a camera so as to have a view of the bagging area, it is also possible to place a camera to have a view of a customer's cart, to allow the customer to place a large item directly into his or her cart without what may be the inconvenient step of first placing the item into the bagging area for examination.

A more complete understanding of the present invention, as well as further features and advantages of the invention, will be apparent from the following Detailed Description and the accompanying drawings.

DETAILED DESCRIPTION

Figure 1:
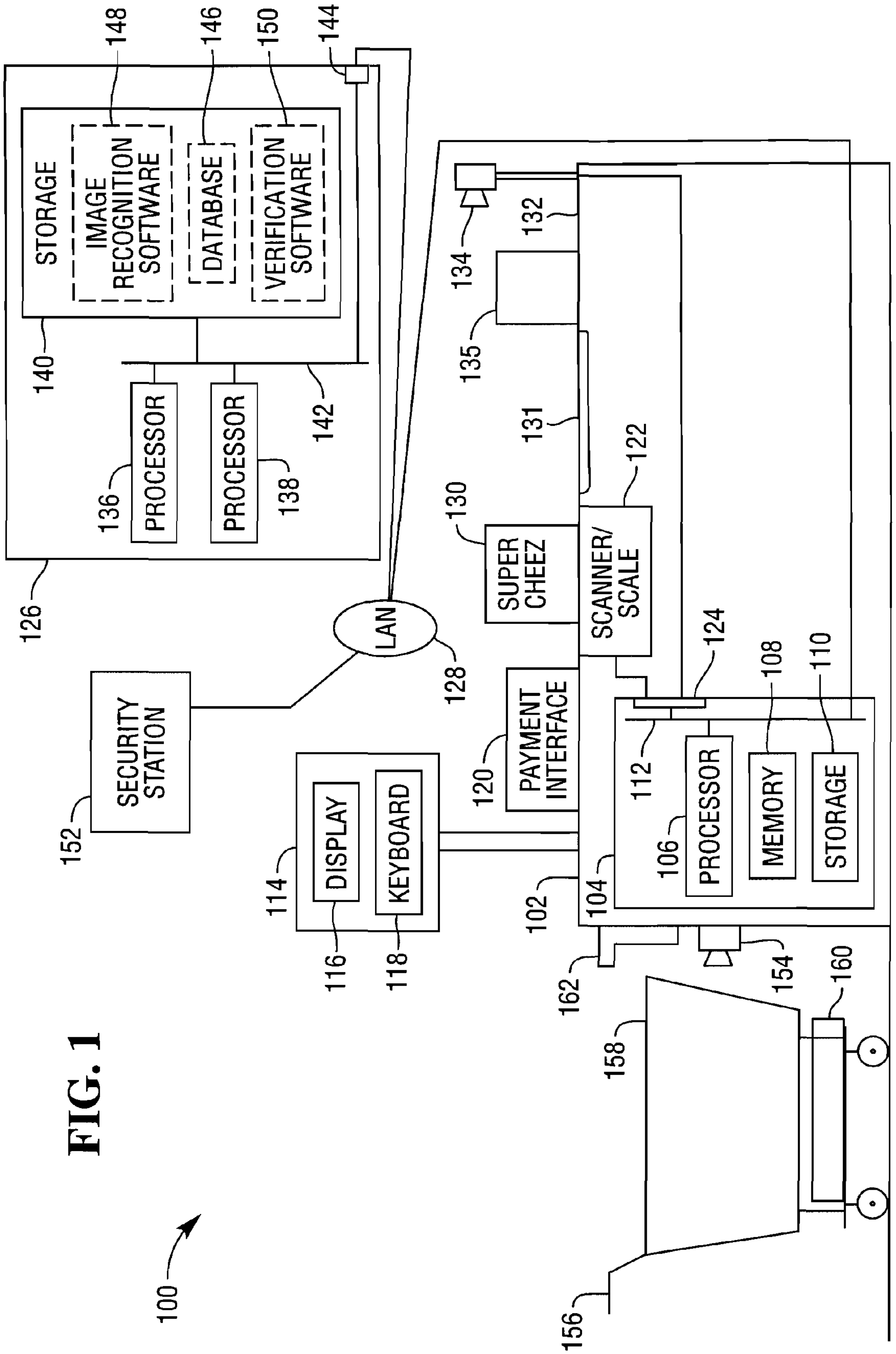
FIG. 1 illustrates a checkout system according to an aspect of the present invention.

FIG. 1 illustrates a checkout system 100 according to an aspect of the present invention. The system 100 is suitably a self service checkout system, but the teachings of the present invention may easily be adapted to use with an employee operated checkout system, of for other types of inventory or transaction control. The system 100 includes a point of sale terminal 102, suitably including a computer 104. The computer 104 may suitably include a processor 106, high speed memory 108, long term storage 110, all communicating over a bus 112. The terminal 102 may employ various data entry devices, such as a user interface 114, including a display screen 116, which may suitably be a touch screen, and keyboard 118. The user interface 114, as well as additional data entry devices, such as a payment interface 120 and scanner/scale combination 122, communicate with the computer 104 through one or more device interface connections, such as the device interface 124. The interface 124 may suitably be a set of universal serial bus (USB) ports, a combination of USB ports and other types of ports, or any other suitable combination of communication connectors. The computer 104 may communicate with a central server 126 over a local area network 128.

A customer using the point of sale terminal 102 suitably passes an item, such as a box of crackers 130, over the scanner 122, or enters the item into the transaction in some other way, such as by using the keyboard 118. The customer then places the item into a post scan area, such as on a conveyer belt 131 or in a bagging area 132. The computer 104 uses a camera 134 with a view of the post scan area, such as the conveyor belt 131, or the bagging area to capture an image of the item. The camera 134 may suitably be able to pan, tilt, and zoom under the control of the computer 104. The captured image is then used for comparison against a stored set of images of the item identified as having been entered into the transaction. The server 126 suitably includes a processor 136, memory 138, and long term storage 140, communicating with one another over a bus 142. The server 126 communicates with the local area network through an interface 144. If desired, the computer 104 may use the camera 134 to capture a moving image of the item. This moving image is taken as soon as the item has been scanned, and continues until a video clip of a predetermined duration, such as several seconds, has been captured. By taking such a video clip, the computer is able to capture information that can be used for image matching without requiring a customer to place the object in a stationary position for image capture before proceeding to place the item in a container for removal. Moving video can be captured of the item as it is moved in the customers hand past the scanner 122 and into a bag 135. The customer's hand will typically obscure only a relatively small portion of a product, because many or most products are larger than a human hand and because in any event the customer typically grips only a small portion of the product or product container. Therefore, in most cases, a sufficient portion of the item will be visible to the camera 134 so that a suitable image will be available for image recognition.

The server 126 maintains an image database 146 on the long term storage 140. The processor 136 uses image recognition software 148 to process the image captured by the camera 134, which is transmitted to the server 126 by the computer 104. Each image in the database 146 suitably includes one or more views of each item for which image recognition capability is to be provided. One particularly advantageous number of views to be provided is six. Providing six views helps to insure a good possibility of a match, no matter what camera angle happens to have taken the image, or how the customer places the item in the camera zone, and to provide for matching multiple views with a perspective view that may have been captured by the camera 134. While image processing is described here as being performed by the server 126, it will be recognized that the computer 104 may store and execute image recognition software, retrieving image information from the database 146 and comparing it against image information captured by the camera 134. If a moving image has been captured, various frames of the moving image may be used for the comparison.

Image comparisons conducted in performing image recognition may suitably be made only against the single image set of the item that was entered into the transaction, thereby greatly reducing the computational resources needed for the comparison, as contrasted to a comparison against the images of the entire array of goods that may be carried by a retailer using the system 100.

Once image recognition has been performed, verification software 150, suitably hosted on the storage 140, examines the recognition results to determine if a match has occurred. If the image captured by the camera 134 matches an image from the image set associated with the product entered into the transaction, the verification software 150 approves the transaction entry. If a match does not occur, or if no product is present in the bagging area 132, a mismatch, possibly caused by an error or by a deliberate substitution, may have occurred, and the verification software module 150 may trigger an alert, suitably by transmitting a suitable notification to a security station 152. The alert may suitably indicate the nature of the anomaly, such as a mismatch or a failure to identify any object at all in the bagging area 132. If desired, a record for an item may include one or more sets of images of high value items that may commonly be stolen through fraudulent substitution of the item that was entered into the transaction. If a mismatch occurs, a matching attempt may be made using images of the high value items, and if this attempt results in a match, the identity of the high value item may be included in an alert.

In addition, or as an alternative, to scanning an object using the scanner 122 and taking a view of the bagging area 132, once a scanned object has been placed into the bagging area, a camera 154 may be positioned so as to take a view of a shopping cart 156 including the lower area of the cart 156, allowing the customer to place some goods, such as large, heavy, or bulky goods, directly into the cart 156 or the area under the cart basket 158, without requiring an intermediate step of placing the goods in the bagging area 132, while still allowing for verification of entry of the goods into the transaction. A large box 160 can presently be seen in the area under the cart basket 158. A handheld scanner 162 can be used to scan an object such as the box 160, and the camera 154 can be used for verification, without a need for a customer to remove the box 160 and place it on the scanner 122, and without a need for intervention by a store employee for transaction entry and verification. With such an arrangement, if the camera 134 is not present or has failed to capture a matching image, an image can be taken using the camera 154. This image can then be compared against the stored image set in order to determine if a mismatch has occurred. For example, if the handheld scanner 162 is used to scan a bar code on the box 160, the camera 134 can be used to attempt to capture an image, as typically occurs when an item is placed in the bagging area 132. Because the box 160 is not present in the bagging area, a mismatch will occur. The camera 154 may then be used to attempt to capture an image and the image thus captured may be used to attempt a match. In the absence of an error, the match will be successful and the transaction can proceed normally.

The records retrieved for a product may include information indicating the weight or bulk of the product, or may simply indicate whether the product is of such a nature that it is likely to be kept in the cart 156. When information is received for such products, the camera 154 may be used to attempt an image capture, with the camera 134 being used only if the initial matching attempt fails.

Figure 2:
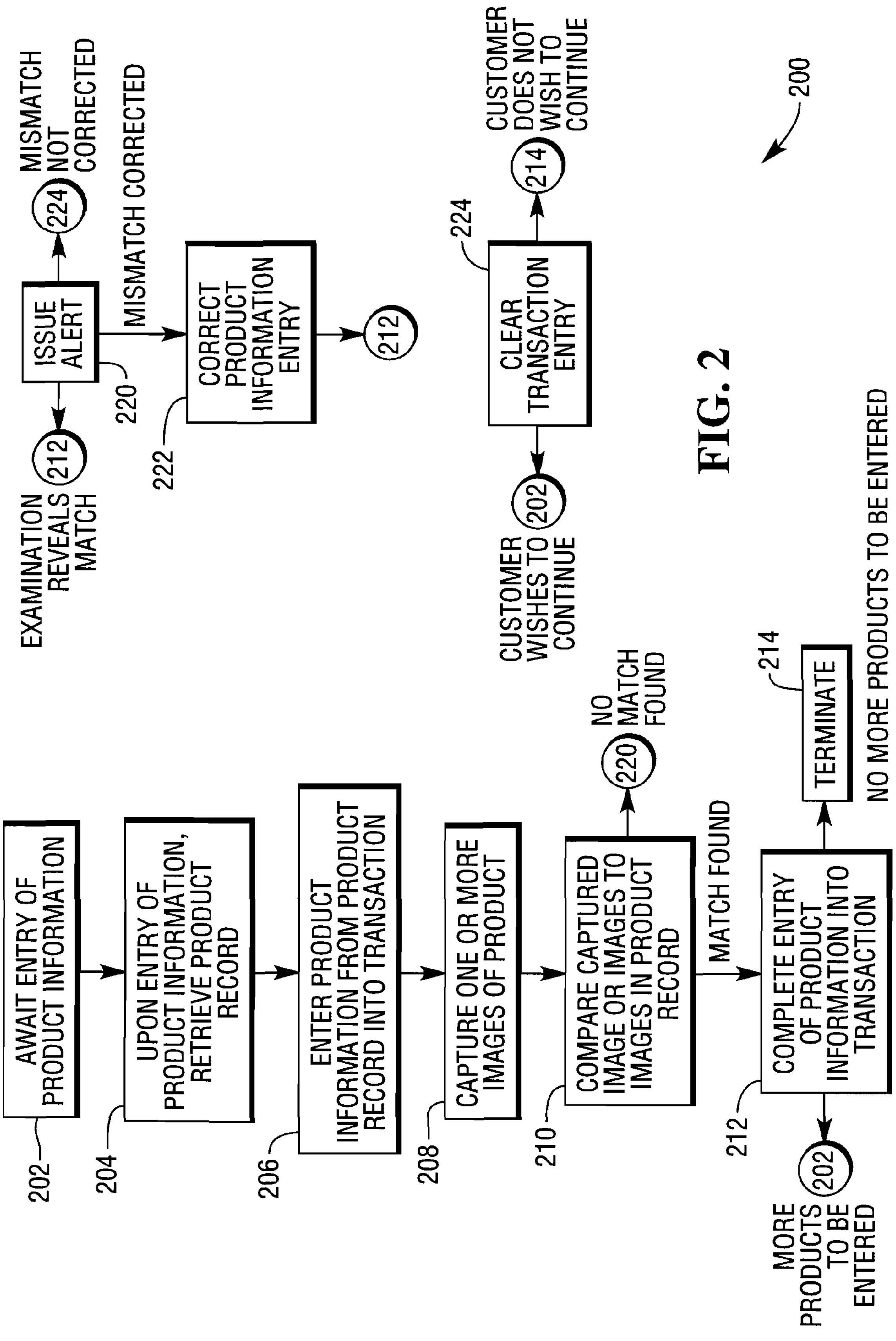
FIG. 2 illustrates a process of checkout transaction processing and verification according to an aspect of the present invention.

FIG. 2 illustrates the steps of a process 200 of checkout verification using image recognition according to an aspect of the present invention. At step 202, entry of product information is awaited. At step 204, upon receipt of indicia identifying a product, such as bar code information or radio frequency identification (RFID) information, a product record is retrieved, including information such as price and identification information, as well as a set of product images. At step 206, appropriate product information from the product record is tentatively entered into a transaction. At step 208, after entry of the product information, one or more images of the product are captured. Taking of the images may include positioning the camera or setting the field of view of the camera to provide an image as conducive to automated processing and comparison as possible, or may include capturing a moving image. At step 210, the captured image or images, or selected frames of a moving image, are compared to the set of product images in the product record. If the captured image or images are determined to match the set of product images, the process proceeds to step 212, verification succeeds, and the entry of the product information into the transaction is completed. If no more entries are to be made, the process proceeds to step 214, payment is tendered, and the transaction is completed. If more entries are to be made, the process then returns to step 202.

If a match is not determined to have occurred, the process skips to step 220 and an alert is sent to an appropriate location, such as a security station. The alert may suitably provide an indication of the nature of the problem. After response to the alert, the process proceeds in a manner dependent on the nature of the resolution. If the product whose image was captured does in fact match the transaction entry, the process returns to step 212 and proceeds normally. If a mismatch did occur but is corrected, the process proceeds to step 222, corrected information is entered and verified, and the process returns to step 212. If the mismatch is not corrected, the process proceeds to step 224 and the transaction entry is cleared. If the customer wishes to abort the entry in question but to continue entering transactions, the process returns to step 202 and the transaction continues. If the customer does not wish to continue the transaction, the process proceeds to step 214 and the transaction concludes.

While the present invention is disclosed in the context of a presently preferred embodiment, it will be recognized that a wide variety of implementations may be employed by persons of ordinary skill in the art consistent with the above discussion and the claims which follow below.

We claim:

1. A system for checkout verification, comprising:

a data entry device for entering product identification information;

a camera for capturing an image of a product presented for purchase; and a processor for receiving the product identification information and the image of the product presented for purchase and using the product identification information as an index for retrieving a set of images associated with the product for which information was entered, the processor being further operative to compare the image of the product presented for purchase with the retrieved set of images in order to determine if the product presented for purchase matches the product for which identification information was entered;

wherein the processor issues a security alert if an image of a product presented for purchase cannot be identified;

wherein the processor issues a security alert if a mismatch occurs between the image of the product presented for purchase and the image associated with the product for which identification information was entered; and wherein the processor issues a security alert if no image of a product presented for purchase is captured.

2. The system of claim 1, wherein the set of images comprises multiple images showing the product from multiple points of view.

3. The system of claim 1, wherein the camera provides a view of a bagging area in order to capture an image of a product placed in the bagging area.

4. The system of claim 3, wherein the processor is further operative to receive a view of a customer shopping cart in order to capture an image of a product placed in the customer shopping cart.

5. The system of claim 1, wherein the set of images is retrieved from a product image database including an image set for each of a plurality of products carried by a retailer.

6. The system of claim 1 comprising a self-checkout scanning system and wherein the data entry device comprises a bar code scanner utilized by a customer to scan a bar code on the product presented for purchase.

7. A system for checkout verification, comprising:

a data entry device for entering product identification information;

a camera for capturing an image of a product presented for purchase; and a processor for receiving the product identification information and the image of the product presented for purchase and using the product identification information as an index for retrieving a set of images associated with the product for which information was entered, the processor being further operative to compare the image of the product presented for purchase with the retrieved set of images in order to determine if the product presented for purchase matches the product for which identification information was entered;

8. A system for checkout verification, comprising:

a data entry device for entering product identification information;

a camera for capturing an image of a product presented for purchase; and a processor for receiving the product identification information and the image of the product presented for purchase and using the product identification information as an index for retrieving a set of images associated with the product for which information was entered, the processor being further operative to compare the image of the product presented for purchase with the retrieved set of images in order to determine if the product presented for purchase matches the product for which identification information was entered;

wherein the data entry device comprises a bar code scanner;

wherein if the processor determines the product presented for purchase does not match the product for which identification information was entered using the bar code scanner, verification software triggers an alert;

wherein a record for the product includes one or more sets of images of high value items that may commonly be stolen through fraudulent substitution for the product; and wherein upon determination the product presented for purchase does not match, a matching attempt is made by the processor using images of the high value items.

* * * * *